3,591,659
POLYESTER-ACRYLIC ACID ESTER POLYMER
THERMOPLASTIC MOULDING COMPOSITIONS
Ludwig Brinkmann, Frankfurt am Main, Harald Cherdron, Wiesbaden, and Klaus-Dieter Asmus, Hofheim, Taunus, Germany, assignors to Farbwerke Hoechst Aktiengesellschaft vormals Meister Lucius & Brüning, Frankfurt am Main, Germany
No Drawing. Filed Sept. 23, 1968, Ser. No. 761,839
Claims priority, application Germany, Oct. 10, 1967, P 16 94 200.0
Int. Cl. C08f 29/10, 29/12
U.S. Cl. 260—873     18 Claims

ABSTRACT OF THE DISCLOSURE

Thermoplastic moulding compositions comprising linear saturated polyesters and polymers of esters of acrylic acid, from which shaped articles can be made having a good hardness, abrasion resistance and solvent resistance, and a particularly high impact strength.

---

The invention relates to novel thermoplastic moulding compositions.

It has been proposed to mould thermoplastic moulding compositions containing linear saturated polyesters of aromatic dicarboxylic acids and aliphatic or cycloaliphatic diols into shaped articles. Shaped articles made from non-modified polyethylene terephthalate have a low dimensional stability only because they shrink when heated at high temperatures and change their shape in an uncontrollable manner.

Various methods have been proposed to modify polyethylene terephthalate to obtain moulding compositions from which dimensionally stable articles can be made. It has been proposed, for example, to mix polyesters of saturated aliphatic diols and saturated aromatic dicarboxylic acids, especially polyethylene terephthalate, with polypropylene or poly-4-methylpentene-1 of high molecular weight.

The articles made from the moulding compositions thus obtained have an improved dimensional stability as compared with articles made from non-modified polyethylene terephthalate, but it is still unsatisfactory for many fields of application. It has also been proposed to add to the polyethylene terephthalate finely divided solid inorganic substances which increase the crystallization speed of the moulded polyester composition in the mould. Dimensionally stable articles can be made from moulding compositions of this kind, but their impact strength is not sufficient for some purposes of application.

The present invention provides thermoplastic moulding compositions having excellent properties comprising a mixture of (a) linear saturated polyesters of aromatic dicarboxylic acids and optionally a small quantity of aliphatic dicarboxylic acids with saturated aliphatic or cycloaliphatic diols and (b) 0.05 to 25% by weight, preferably 0.2 to 10% by weight, calculated on the total mixture, of polymers of esters of acrylic acid, methacrylic acid or ethacrylic acid and saturated aliphatic or cycloaliphatic alcohols containing 1 to 30, preferably 4 to 16 carbon atoms.

It is very surprising that the impact strength of the modified polyesters is improved without the hardness, abrasion resistance and solvent resistance being substantially impaired.

Nucleating agents may be added to the moulding compositions according to the invention, which agents are known to increase the speed of crystallization of the polyester composition and ensure that the polyester shaped article reaches a good degree of crystallization. Shaped articles having a good degree of crystallization are dimensionally stable also at a temperature above the second order transition temperature and do not shrink. Finely divided inorganic substances which are insoluble in the polyester moulding composition, for example calcium carbonate, aluminum silicate or talc may be used as nucleating agents.

The linear saturated polyester of aromatic dicarboxylic acids is preferably polyethylene glycol terephthalate, but other polyesters may be used, too, for example polycyclohexane-1,4-dimethylol terephthalate. There are also suitable modified polyethylene terephthalates which contain, in addition to terephthalic acid units, units of other aromatic or aliphatic dicarboxylic acids, for example units of isophthalic acid, naphthalene-2,6-dicarboxylic acid or adipic acid and/or in addition to ethylene glycol units, units of other diols, for example of 1,4-butane-diol or neopentyl glycol. The polyesters have a reduced specific viscosity of from 0.6 to 2.0, preferably 0.9 to 1.6 dl./g., measured in a 1% solution in a 60:40 mixture of phenol and tetrachloroethane at 25° C. Polyesters having a reduced specific viscosity of from 1.0 to 1.4 are especially suitable. Polyesters of lower reduced specific viscosity may alternatively be used and the viscosity raised within the preferred range by a post-condensation during the course of the mixing process.

As polymers of esters of acrylic acid, methacrylic acid or ethacrylic acid numerous polymers can be used which are prepared by known methods. The aliphatic or cycloaliphatic alcohol units in the polymers may contain from 1 to 30 carbon atoms, preferably from 4 to 16 carbon atoms. The aliphatic alcohol units may have straight or branched chains and the cycloaliphatic alcohol radicals may carry the hydroxyl group on the ring or in a side chain. The polyesters can also be mixed with copolymers of various polyacrylic acid esters or polyalkylacrylic acid esters. Alternatively, there may be used mixtures of polyacrylic acid esters of polyalkylacrylic acid esters.

The polymers of the esters of acrylic acid, methacrylic acid or ethacrylic acid have a molecular weight of at least 3,000, preferably above 10,000.

The polyester moulding compositions according to the invention contain 0.05 to 25% by weight, preferably 0.2 to 10% by weight of the polyacrylic or polyalkylacrylic acid esters.

Mixing of the polyacrylic acid ester or polyalkylacrylic acid ester with the polyester composition can be effected by various methods. The polyacrylic acid ester or polyalkylacrylic acid ester and the polyester may be blended, for example, by intensely stirring the melt. If necessary, the melt is stirred under reduced pressure until the desired reduced specific viscosity is reached. Alternatively, the pulverulent polyacrylic acid ester can be mixed as uniformly as possible with the pulverulent or granulated polyester, the mixture can be fused in an extruder, extruded whilst cooling and granulated. If desired, the polyester moulding compositions obtained in this manner can be subjected to an after condensation in the solid phase, whereby polyester compositions having especially high molecular weights are obtained.

The nucleating agents, such as calcium carbonate, aluminum silicate, titanium dioxide, talc or soot, can be added to the moulding compositions of the invention at various stages of the manufacturing process. For example, the nucleating agent may be added during the manufacture of the starting polyester or in the course of polycondensation. Alternatively, the nucleating agent may be admixed with the polyester together with the polyacrylic acid ester or polyalkylacrylic acid ester. Still further, it is possible to mix the granulated polyester moulding composition with the nucleating agent in a rotating drum and optionally fuse the mixture in an extruder, extrude it whilst cooling and granulate it.

The polyester moulding composition advantageously contains as little moisture as possible, preferably less than 0.01% by weight. In order to keep the moisture uptake low, the granulated polyester moulding composition may be coated with a coating of an inert hydrophobic substance, for example paraffin or wax.

In order to obtain shaped articles having a sufficiently high degree of crystallization it is expedient to mould at a temperature sufficiently above the second order transition temperature.

The polymer mixtures according to the invention may be processed in the thermoplastic state and yield shaped articles which are dimensionally stable and distinguished by having a considerably improved impact strength without the hardness, abrasion resistance and solvent resistance being impaired.

The following examples serve to illustrate the invention but they are not intended to limit it thereto.

EXAMPLE 1

3,880 grams polyethylene terephthalate (reduced specific viscosity 0.83 dl./g., measured in a 1% solution in a 60:40 mixture of phenol and tetrachloroethane at 25° C.) were mixed with 120 grams of poly-2-ethylhexylacrylate and the mixture was fused. The melt was stirred for 30 minutes at 275° C. under a pressure of 0.3 mm. of mercury. The cooled mixture was comminuted. 3 kilograms of the mixture were subjected to rotation in a rotational evaporator for 1 hour at a temperature of 100° C. and at a pressure of 0.5 mm. of mercury and then subjected to a further rotation for 5 hours at 180° C. and at a pressure of 0.5 mm. of mercury. The product was allowed to cool under nitrogen. It was then subjected to rotation for 1 hour under nitrogen with 6.0 grams of aluminum silicate powder (47% of $SiO_2$, 38% of $Al_2O_3$, 75% of the particles had a diameter of less than 2 microns). The product was fused in an extruder and granulated. The polyester granules were subjected to rotation for 1 hour at 100° C. under a pressure of 0.5 mm. of mercury, then for 6 hours at 240° C. under a pressure of 0.5 mm. of mercury, and thereafter for 2 hours at 90° C. with 12 grams of paraffin (drop point 56° C.). Dimensionally stable sheets of dimension 60 x 60 x 1 mm. were injection moulded from the resulting material at a mould temperature of 150° C. The impact strength of the sheets was tested by a drop test in which the test sheets were imposed to impact stress by allowing a falling hammer sliding on low friction tracks to drop vertically from various heights onto the sheets clamped in a frame. The tip of the dropping hammer represented a hemisphere having a radius of 10 millimeters. 10 sheets were tested for each height.

In a comparison experiment polyethylene terephthalate was treated as described above, but with the difference that no poly-2-ethylhexylacrylate was added. The results of the drop test are summarized in the table.

EXAMPLE 2

3960 grams of polyethylene terephthalate (reduced specific viscosity 0.83 dl./g., measured in a 1% solution in a 60:40 mixture of phenol and tetrachloroethane at 25° C.) were mixed as described in Example 1 with 40 grams of poly-2-ethylhexylacrylate. The polyester moulding composition was further processed as described in Example 1 with the addition of 6.0 grams of powdered aluminum silicate and 12.0 grams of paraffin. The results of the drop test are given in the table.

EXAMPLE 3

3380 grams of polyethylene terephthalate (reduced specific viscosity 0.83 dl./g., measured in a 1% solution in a 60:40 mixture of phenol and tetrachloroethane at 25° C.) were mixed as described in Example 1 with 120 grams of poly-n-octyl-acrylate. The polyester moulding composition was further processed as described in Example 1. As nucleating agent 6.0 grams of powdered aluminum silicate were used. The finished polyester granules were coated with 12.0 grams of paraffin. The product was tested as described in Example 1.

TABLE

| Polyester | Polyacrylate | Amount added, percent by weight | Dropping height, F. 20 [1] in cm. |
|---|---|---|---|
| Polyethylene terephthalate | | | 55 |
| Do | Poly-2-ethylhexylacrylate | 3 | 125 |
| Do | Poly-3-ethylhexylacrylate | 1 | 90 |
| Do | Poly-n-octyl acrylate | 3 | 105 |

[1] Height in cm. at which the impact energy was sufficient to break 20% of the sheets.

What is claimed is:

1. Thermoplastic molding composition comprising a mixture of
   (a) a linear saturated polyester of an aromatic dicarboxylic acid with a saturated diol, said polyester having a reduced specific viscosity of from 0.6 to 2.0 measured in a 1% solution in a 60:40 mixture of phenol and tetrachloroethane at 25° C., and
   (b) from 0.05 to 25% by weight, calculated on the total mixture, of a polymer of an ester of acrylic acid, methacrylic acid or ethacrylic acid and a saturated aliphatic or cycloaliphatic alcohol of 1 to 30 carbon atoms, said polymer having a molecular weight of at least 3,000.

2. A thermoplastic molding composition as defined in claim 1, wherein the polyester contains, in addition to terephthalic acid units, units of isophthalic acid, naphthalene-2,6-dicarboxylic acid or adipic acid.

3. A thermoplastic molding composition as defined in claim 1, wherein the polyester contains, in addition to ethylene glycol units, units of 1,4-butane-diol or neopentyl-diol.

4. A thermoplastic moulding composition as claimed in claim 1, wherein the polyester is polyethylene glycol terephthalate.

5. A thermoplastic moulding composition as claimed in claim 1, wherein the polyester is polycylcohexane-1,4-dimethylol terephthalate.

6. A thermoplastic moulding composition as claimed in claim 1, wherein the polyester contains, in addition to terephthalic acid units, units of isophthalic acid.

7. A thermoplastic moulding composition as claimed in claim 1, wherein the polyester contains, in addition to terephthalic acid units, units of naphthalene-2,6-dicarboxylic acid.

8. A thermoplastic moulding composition as claimed in claim 1, wherein the polyester contains, in addition to terephthalic acid units, units of adipic acid.

9. A thermoplastic moulding composition as claimed in claim 1, wherein the polymer contains, in addition to ethylene glycol units, units of neopentyl glycol.

10. A thermoplastic moulding composition as claimed in claim 1, wherein the polyester contains, in addition to ethylene glycol units, units of butane-diol-1,4.

11. A thermoplastic moulding composition as claimed in claim 1, wherein the polyester has a reduced specific viscosity of from 0.9 to 1.0–1.4 to 1.6, measured in a 1% solution in a 60:40 mixture of phenol and tetrachloroethane at 25° C.

12. A thermoplastic moulding composition as claimed in claim 1, wherein the alcohol units of the polymer of acrylic, methacrylic or ethacrylic acid contain 4 to 16 carbon atoms.

13. A thermoplastic moulding composition as claimed in claim 1, wherein the cycloaliphatic alcohol units carry the hydroxyl group on the ring or in the side chain.

14. A thermoplastic moulding composition as claimed in claim 1, wherein the polymer contains more than one acrylic or alkylacrylic acid ester.

15. A thermoplastic moulding composition as claimed in claim 1, wherein the polymers of esters of acrylic, methacrylic or ethacrylic acid have a molecular weight above 10,000.

16. A thermoplastic moulding composition as claimed in claim 1, wherein the polymers of esters of acrylic, methacrylic and ethacrylic acid are used in an amount of from 0.2 to 10% by weight, calculated on the total mixture.

17. Thermoplastic moulding compositions as claimed in claim 1, wherein the composition contains a solid inorganic substance as nucleating agent.

18. Shaped articles made from the thermoplastic moulding compositions claimed in claim 1.

References Cited

UNITED STATES PATENTS

| | | | |
|---|---|---|---|
| 3,290,411 | 12/1966 | Tsuji et al. | 260—873 |
| 3,398,014 | 8/1968 | Turner | 117—111 |

FOREIGN PATENTS

| | | | |
|---|---|---|---|
| 1,266,719 | 6/1961 | France | 260—873 |
| 1,103,015 | 3/1961 | Germany | 260—873 |
| 775,764 | 5/1957 | Great Britain | 260—873 |

WILLIAM H. SHORT, Primary Examiner

E. WOODBERRY, Assistant Examiner